United States Patent
Jones, III et al.

(10) Patent No.: US 9,465,166 B2
(45) Date of Patent: Oct. 11, 2016

(54) FIBER OPTIC SPLICE PROTECTING SYSTEM AND METHOD FOR PROTECTING A FIBER OPTIC SPLICE

(71) Applicants: Emory E. Jones, III, Fincastle, VA (US); Carl W. Stoesz, Blacksburg, VA (US)

(72) Inventors: Emory E. Jones, III, Fincastle, VA (US); Carl W. Stoesz, Blacksburg, VA (US)

(73) Assignee: BAKER HUGHES INCORPORATED, Houston, TX (US)

(*) Notice: Subject to any disclaimer, the term of this patent is extended or adjusted under 35 U.S.C. 154(b) by 0 days.

(21) Appl. No.: 14/526,920

(22) Filed: Oct. 29, 2014

(65) Prior Publication Data

US 2015/0110450 A1 Apr. 23, 2015

Related U.S. Application Data

(63) Continuation-in-part of application No. 13/904,727, filed on May 29, 2013, now abandoned.

(51) Int. Cl.
*G02B 6/255* (2006.01)

(52) U.S. Cl.
CPC .................... *G02B 6/2558* (2013.01)

(58) Field of Classification Search
CPC ................. G02B 6/255; G02B 6/00
USPC ...................................... 385/99, 66
See application file for complete search history.

(56) References Cited

U.S. PATENT DOCUMENTS

| | | | | |
|---|---|---|---|---|
| H000595 H | * | 3/1989 | Lafaw | G02B 6/25 174/50 |
| 5,059,790 A | * | 10/1991 | Klainer et al. | G01N 21/7703 250/227.21 |
| 6,337,737 B1 | * | 1/2002 | Chang et al. | G01D 5/35316 250/227.18 |
| 6,485,199 B1 | * | 11/2002 | Ware | G02B 6/255 385/95 |
| 7,272,282 B1 | * | 9/2007 | Seddon | G02B 6/4475 385/100 |
| 7,494,289 B1 | * | 2/2009 | Chen | G02B 6/2558 385/95 |
| 2002/0147394 A1 | * | 10/2002 | Ellingsen | A61B 5/01 600/410 |
| 2003/0128944 A1 | * | 7/2003 | Skutnik | C03B 37/016 385/123 |
| 2004/0005120 A1 | * | 1/2004 | Takeda | G02B 6/43 385/60 |
| 2006/0254799 A1 | * | 11/2006 | Gregorek | H01R 4/70 174/74 A |
| 2007/0263964 A1 | * | 11/2007 | Cody | G02B 6/4472 385/100 |
| 2008/0247714 A1 | * | 10/2008 | Nakamura | G02B 6/2551 385/96 |
| 2008/0273852 A1 | * | 11/2008 | Parker | G01J 5/08 385/128 |

(Continued)

FOREIGN PATENT DOCUMENTS

| | | | |
|---|---|---|---|
| DE | 19515548 A1 | | 10/1996 |
| EP | 501297 A1 | | 9/1992 |
| JP | 05288950 A | * | 11/1993 |
| JP | 09159861 A | * | 6/1997 |
| JP | 2008181026 A | * | 8/2008 |

OTHER PUBLICATIONS

Splice Technologies, Inc., "High Temperature Series Single Fiber Fusion Splice Protection Sleeve"; http://www.splicetechnologies.com/HighTemperatureSeriesSingleFiber.php?id=FSS-SCH40; 2013; 1 page.

(Continued)

*Primary Examiner* — Kaveh C Kianni
(74) *Attorney, Agent, or Firm* — Cantor Colburn LLP

(57) ABSTRACT

A fiber optic splice protecting system and method includes a tubular sized to fit around spliced ends of optical fibers, and a sealant positioned in an annular space defined between the optical fibers and the tubular. The sealant is configured to cure from a liquid to a solid. The tubular is at least partially formed of a material that is gas permeable.

20 Claims, 2 Drawing Sheets

(56) References Cited

U.S. PATENT DOCUMENTS

| | | | |
|---|---|---|---|
| 2009/0103870 A1* | 4/2009 | Solomon | G02B 6/3801 385/98 |
| 2010/0000260 A1* | 1/2010 | Sandoz | C03B 37/0122 65/399 |
| 2012/0020630 A1* | 1/2012 | Vastmans | G02B 6/2558 385/99 |

OTHER PUBLICATIONS

Splice Technologies, Inc., "High Temperature Series Single Fiber Low Profile Fusion Splice Protection Sleeve"; http://www.splicetechnologies.com/HighTemperatureSeriesSingleFiber.php?id=FSS-SCH60; 2013; 1 page.

* cited by examiner

FIBER OPTIC SPLICE PROTECTING SYSTEM AND METHOD FOR PROTECTING A FIBER OPTIC SPLICE

CROSS REFERENCE TO RELATED APPLICATION

This application is a continuation-in-part of U.S. patent application Ser. No. 13/904,727 filed on May 29, 2013. The parent application is incorporated by reference herein in its entirety.

BACKGROUND

Optical fiber is employed for a variety of uses including as a conduit for communication signals and for measuring strain and temperature exhibited therein as well as in structures to which the optical fiber is attached. Optical fibers are spliced together whenever two lengths of fiber need to be functionally connected. Depending upon the environment in which the optical fiber will be employed, it may be desirable to protect the splice. Shrink tubing is commonly employed for this purpose. In such cases the shrink tubing is shrunk to radially compress and thereby attach to the fiber in an area surrounding the splice. While protection provided in this manner is sufficient for some applications, other systems and methods for protecting splices may be better suited for other applications.

The art would be receptive to alternative devices and methods for protecting fiber optic splices.

BRIEF DESCRIPTION

A fiber optic splice protecting system includes a tubular sized to fit around spliced ends of optical fibers, and a sealant positioned in an annular space defined between the optical fibers and the tubular. The sealant is configured to cure from a liquid to a solid. The tubular is at least partially formed of a material that is gas permeable.

A method of protecting a fiber optic splice includes surrounding spliced optical fibers with a tubular, the tubular formed at least partially of a gas permeable material, positioning a sealant while uncured in an annular space defined between the optical fibers and the tubular, and curing the sealant.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
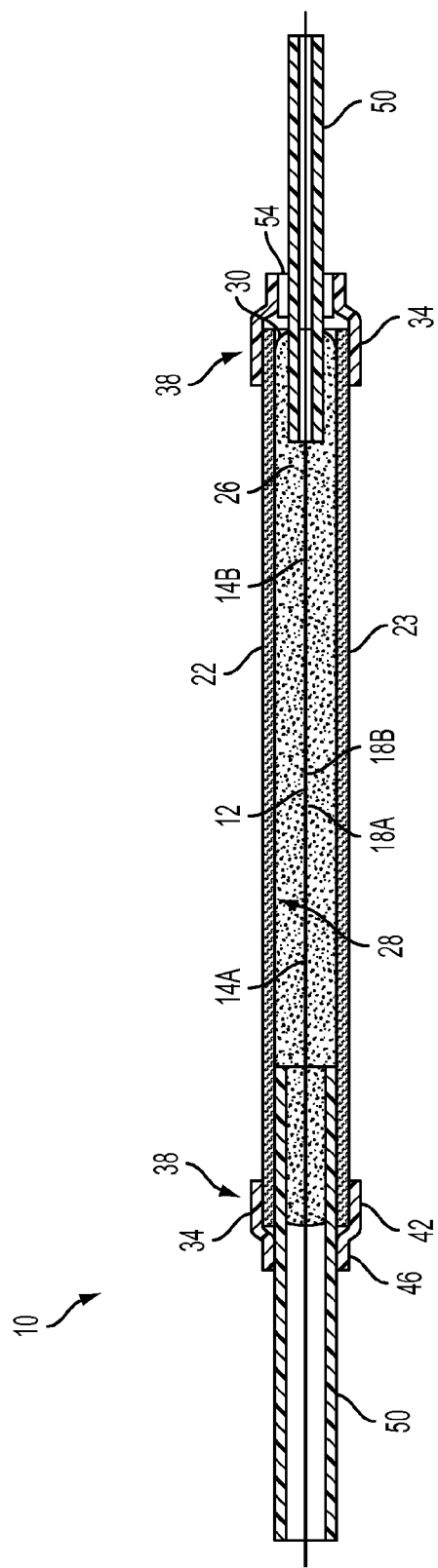
FIG. 1 depicts a cross-sectional view of an exemplary embodiment of a fiber optic splice protecting system disclosed herein.

Referring to FIG. 1, an embodiment of a fiber optic splice protecting system disclosed herein is illustrated at 10. The splice protecting system 10 includes a tubular 22 sized to fit over a splice 12, formed by ends 18A and 18B of optical fibers 14A and 14B respectively that have been functionally attached together, while leaving an annular space 26 between an inside surface 28 of the tubular 22 and the fibers 14A and 14B. A sealant 30, flowable when liquid, is positioned in the annular space 26 and maintained there while it cures to a solid.

The optical fibers 14A, 14B are employable in a variety of environments and for a number of uses. For example, the optical fibers 14A, 14B may be used in earth formation boreholes in industries such as carbon dioxide sequestration and hydrocarbon recovery. In these industries the optical fibers can be employed to monitor parameters such as temperature, pressure and strain, for example, at locations thousands of feet into the borehole. The optical fibers 14A, 14B can also provide a conduit for communication via light transmitted therethrough.

Regardless of the particular use of the optical fibers 14A, 14B, such environments can be harsh and therefore protecting the splice 12 is warranted. Protection of the splice 12 in such environments is enhanced by selecting materials for the tubular 22 and the sealant 30 that can withstand high temperatures, pressures and caustic fluids. Embodiments disclosed herein include the tubular 22 being made at least partially of a material 23 that is gas permeable. For example, the material 23 may be finely porous, such as a woven material having interstices between fibers, and more particularly a woven fiberglass material. Alternatively, the material may be made of a heat resistant material, such as, but not limited to, polymeric materials such as polytetrafluoroethylene (PTFE), polyimide (PI) or other polymer, where the material 23 is punctured or otherwise provided with pores. The permeability of the material 23 allows the sealant 30 to cure properly by aspirating any outgasses of the sealant 30 during the curing process. The material 23 of the tubular 22 is able to withstand high temperatures and caustic environments. The sealant 30 may be a high temperature silicone sealant, such as, Dow Corning (Registered Trademark) 736 Oil Resistant Sealant, for example. These materials are resistant to many caustic environments and have excellent high temperature capabilities. The sealant 30 is typically the thermal limiting component in the system 10, since, for example, woven fiberglass is rated for significantly higher temperatures than the sealant 30. One exemplary woven fiberglass tubing is rated for continuous operation at 648 degrees Celsius, and has been used in other applications at over 850 degrees Celsius. Thus, employing these materials for the tubular 22 and the sealant 30 assures that the splice 12 is protected at continuous temperatures at least as high as 260 degrees Celsius and temporary temperatures at least as high as 315 degrees Celsius.

The sealant 30 can be injected into the annular space 26 with a syringe with a flexible needle sized to fit within the annular space 26. With care the sealant 30 can be injected without bubbles. During such injection, in this embodiment, the sealant 30 flows around the optical fibers 14A, 14B a full 360 degrees thereby spacing the optical fibers 14A, 14B from the tubular 22 and preventing contact between the optical fibers 14A, 14B and the tubular 22. The viscosity of the sealant 30 can help to hold the ends 18A, 18B of the optical fibers 14A, 14B relative to and fully within the tubular 22 while curing. A chemical bond between the sealant 30 and both the optical fibers 14A, 14B and the tubular 22, once the sealant 30 is cured into a solid, can further maintain the relative position between the splice 12 and the tubular 22. Elasticity of the sealant 30 when solid allows for deflections between the optical fibers 14A, 14B and the tubular 22 without inducing strain in either that could be detrimental thereto.

Because the tubular 22 is at least partially formed of a material that is gas permeable, when the sealant 30 is injected into the tubular 22, some of the sealant 30 may leak through the pores or interstices of the material 23. However, because the material 23 is only finely porous, a great majority of the injected sealant 30 will remain within the tubular 22 and such leakage would not be detrimental to the end product of the fiber optic splice protecting system 10, but could possibly create a small nuisance mess during assembly. Thus, in order to prevent or at least substantially prohibit leakage through the material 23 of the tubular 22, in an alternative embodiment shown in FIG. 2, an optional coating 25 may be provided on the tubular 22 to prevent, or at least substantially prohibit, leakage of the sealant 30 through pores or interconnected interstices 29 of the material 23, such as between fiberglass fibers 27, exaggerated for clarity in FIG. 2. In an exemplary embodiment, the coating 25 may be a thin layer of a coated compound fixative that prevents leakage when the sealant 30 is first injected. The coating 25 may be temporary and only employed prior to full curing of the sealant 30. The coating 25 may be gas permeable but not liquid permeable, or alternatively the coating 25 may dissolve or otherwise disintegrate prior to curing of the sealant 30, such as when the sealant 30 is no longer fluidic enough to pass through the pores or interstices 29 of the material 23. The temporary coating 25 may alternatively be a substantially liquid impervious sleeve that is physically removed from the tubular 22 prior to being adhered by the sealant 30 to the tubular 22. With at least a partial removal of the temporary coating 25, the gas permeable material 23 is again able to provide the sealant 30 with exposure to surrounding air through the material 23 via connected interstices 29 or other pores in the material 23.

Figure 2:
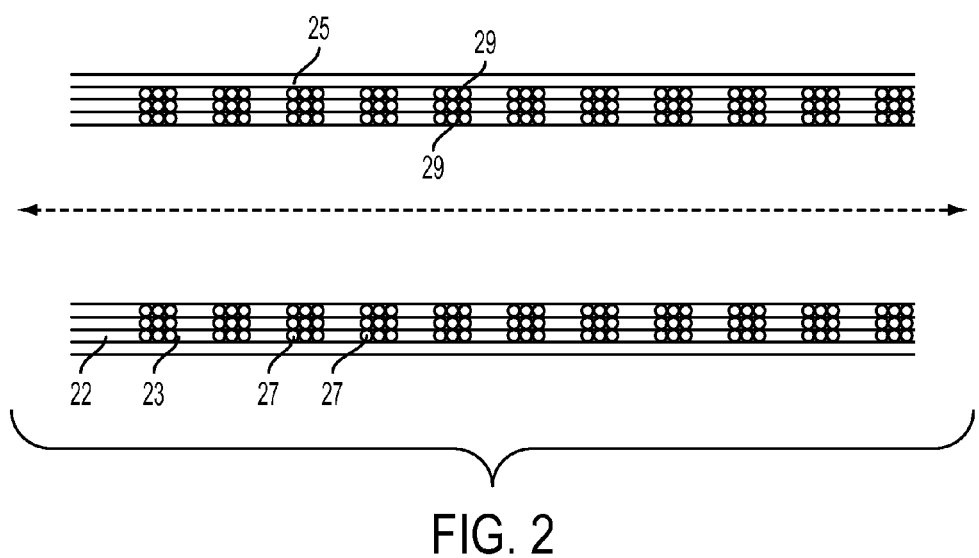
FIG. 2 depicts a cross-sectional view of an exemplary tubular of the fiber optic splice protecting system of FIG. 1 having an exemplary coating; and, FIG. 3 depicts an exemplary embodiment of a support surrounding the exemplary tubular of the fiber optic splice protecting system of FIG. 1.
Figure 3:
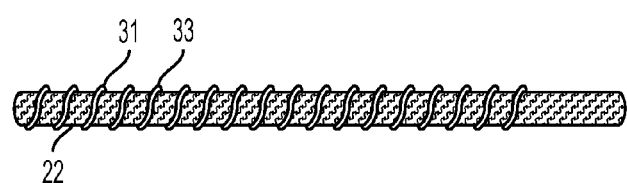

It is important to keep the area of the splice 12 straight to minimize stresses which can cause the splice 12 to fail or have unacceptably high optical losses. Some woven fiberglass tubulars 22 are sufficiently rigid and will stay at least sufficiently straight without any additional support. However, if the material 23 of the tubular 22 is more flexible, a support to hold the tubular 22 straight until the sealant 30 cures may be needed. The flexible tubular 22 may be slid into a support 31, such as shown in FIG. 2, which will hold the tubular 22 sufficiently straight. In one exemplary embodiment, the support 31 is a spring 33 having spaces between turns of the spring 33 so as not to deleteriously impact the exposure of the sealant 30 to air through the gas permeable material 23 of the tubular 22, thus enabling the aspiration of any outgasses of the sealant 30 during curing.

One or two shrinkable tubes 34 positioned at either or both of ends 38 of the tubular 22 can further aid in maintaining the sealant 30 within the tubular 22 while the sealant 30 is curing as well as reduce movement of the tubular 22 relative to the optical fibers 14A, 14B. By positioning the shrinkable tubes 34 with a first portion 42 positioned around the tubular 22 and a second portion 46 positioned beyond the end 38 when the shrinking of the shrinkable tube 34 is performed causes the first portion 42 to become attached to the tubular 22 while the second portion 46 shrinks to a size smaller than an outer diameter of the tubular 22. This condition essentially forms a cap on the ends 38 to hold the sealant 30 within the tubular 22.

Depending upon sizing of the tubular 22, the shrinkable tube 34, and the optical fibers 14A, 14B, the shrinkable tube 34 could also engage with the optical fibers 14A, 14B directly. However, alternate embodiments of the fiber optic splice protecting system 10 disclosed herein employ one or more optional sleeves 50 that encase the optical fibers 14A, 14B over a significant length thereof. The sleeves 50 can extend over a majority of the length of the optical fibers 14A, 14B to provide structural integrity to them when employed in environments wherein they are not otherwise well protected. In an exemplary embodiment employing the sleeves 50, the sleeves 50 are sized to fit within the annular space 26. This condition has the added benefit that the sleeves 50 can prevent the sealant 30 from escaping from within the annular space 26. Additionally, the second portion 46 of the shrinkable tube 34 can shrink down to engage with the sleeve 50 thereby providing additional positional stability between the tubular 22 and the optical fibers 14A, 14B and the sealant 30 within the annular space 26 prior to curing of the sealant 30. In other embodiments an optional collar 54 is positioned between the second portion 46 and the sleeve 50 so that after the shrinkable tube 34 has been shrunk it is engaged with the outer surface of the collar 54.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A fiber optic splice protecting system comprising:
   a tubular sized to fit around spliced ends of optical fibers; and
   a sealant positioned in an annular space defined between the optical fibers and the tubular, the sealant configured to cure from a liquid to a solid;
   wherein the tubular is at least partially formed of a material that is gas permeable.

2. The fiber optic splice protecting system of claim 1, wherein the material of the tubular includes pores.

3. The fiber optic splice protecting system of claim 1, wherein the tubular is resistant to continuous temperatures of at least about 260 degrees Celsius, and resistant to temporary temperatures of at least about 315 degrees Celsius.

4. The fiber optic splice protecting system of claim 1, wherein the material is woven material.

5. The fiber optic splice protecting system of claim 1, wherein the material is woven fiberglass.

6. The fiber optic splice protecting system of claim 1, wherein the material includes fiberglass fibers.

7. The fiber optic splice protecting system of claim 1, wherein the sealant is resistant to continuous temperatures of at least about 260 degrees Celsius, and resistant to temporary temperatures of at least about 315 degrees Celsius.

8. The fiber optic splice protecting system of claim 1, further comprising at least one shrinkable tube configured to engage an outer radial surface of the tubular when in a shrunken state to retain the sealant within the tubular while the sealant is curing.

9. The fiber optic splice protecting system of claim 8, wherein the at least one shrinkable tube positionally retains the tubular relative to the optical fibers while the sealant is curing.

10. The fiber optic splice protecting system of claim 1, further comprising at least one sleeve partially positionable in the annular space defined between the optical fibers and the tubular, wherein the at least one sleeve retains the sealant within the tubular while the sealant is curing.

11. The fiber optic splice protecting system of claim 1, wherein the sealant chemically bonds to at least one of the optical fibers and the tubular.

12. The fiber optic splice protecting system of claim 1, wherein the sealant is elastic when fully cured.

13. The fiber optic splice protecting system of claim 1, wherein the sealant fully surrounds the optical fibers.

14. The fiber optic splice protecting system of claim 1, further comprising a temporary coating on the tubular, the temporary coating operatively disposed on the tubular to at least partially prevent the sealant from passing through the material of the tubular in a liquid stage of the sealant.

15. A method of employing the fiber optic splice protecting system of claim 1 to protect a fiber optic splice, the method comprising:
    surrounding the spliced ends of the optical fibers with the tubular;
    positioning the sealant while uncured in the annular space; and
    curing the sealant.

16. The method of claim 15, further comprising preventing bubbles from entering the sealant while positioning the uncured sealant in the annular space.

17. The method of claim 15, further comprising providing a coating on the tubular to at least partially prevent the sealant from passing through the material of the tubular in a liquid stage of the sealant.

18. The method of claim 17, further comprising removing the coating prior to fully curing the sealant.

19. The method of claim 15, further comprising inserting the tubular in a supporting tube until the sealant is at least partially cured.

20. The method of claim 19, wherein the supporting tube is a spring.

* * * * *